United States Patent
Kishi

(10) Patent No.: US 10,009,515 B2
(45) Date of Patent: Jun. 26, 2018

(54) CALIBRATION SYSTEM, CALIBRATION METHOD, AND IMAGE FORMING APPARATUS THAT ENSURE IMPROVED ACCURACY OF CORRECTION OF TONE CHARACTERISTICS

(71) Applicant: KYOCERA Document Solutions Inc., Osaka (JP)

(72) Inventor: Yoshitaka Kishi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days. days.

(21) Appl. No.: 15/274,670

(22) Filed: Sep. 23, 2016

(65) Prior Publication Data

US 2017/0094128 A1 Mar. 30, 2017

(30) Foreign Application Priority Data

Sep. 29, 2015 (JP) .................................. 2015-191035

(51) Int. Cl.
*H04N 1/60* (2006.01)
*G06K 15/02* (2006.01)

(52) U.S. Cl.
CPC ......... *H04N 1/6041* (2013.01); *G06K 15/027* (2013.01); *H04N 2201/0094* (2013.01)

(58) Field of Classification Search
USPC ....................................................... 358/1.13
See application file for complete search history.

(56) References Cited

U.S. PATENT DOCUMENTS

| 6,214,509 | B1* | 4/2001 | Kasuya | G03G 9/0819 430/110.1 |
| 2009/0027730 | A1* | 1/2009 | Monga | G06K 15/02 358/3.06 |
| 2011/0285777 | A1* | 11/2011 | Goto | B41J 2/2139 347/15 |

FOREIGN PATENT DOCUMENTS

| JP | 2006-222552 A | 8/2006 |
| JP | 2010-226562 A | 10/2010 |

* cited by examiner

*Primary Examiner* — Neil R McLean
*Assistant Examiner* — Darryl V Dottin
(74) *Attorney, Agent, or Firm* — Stein IP, LLC

(57) ABSTRACT

A calibration system includes an imaging device, an image forming apparatus, and a table generating unit. The table generating unit: calculates a first weighting coefficient based on dispersion of color values of pixels inside the patch in a captured image for each of the patches where the captured image is generated by simultaneously capturing the test chart of the sheet generated by the image forming apparatus and a preliminary prepared reference chart with the imaging device; calculates a representative value for each tone of the color value of each of the patches in the test chart and the reference chart based on an average of a weighted average of the color value of the plurality of patches; and generates the gamma correction table based on the respective representative values in the test chart and the reference chart.

4 Claims, 20 Drawing Sheets

CALIBRATION SYSTEM, CALIBRATION METHOD, AND IMAGE FORMING APPARATUS THAT ENSURE IMPROVED ACCURACY OF CORRECTION OF TONE CHARACTERISTICS

INCORPORATION BY REFERENCE

This application is based upon, and claims the benefit of priority from, corresponding Japanese Patent Application No. 2015-191035 filed in the Japan Patent Office on Sep. 29, 2015, the entire contents of which are incorporated herein by reference.

BACKGROUND

Unless otherwise indicated herein, the description in this section is not prior art to the claims in this application and is not admitted to be prior art by inclusion in this section.

A typical calibration method performs correction of input-output characteristics, what is called a gamma correction, caused by a secular change or similar cause in an image forming apparatus such as a printer-only machine and a Multifunction Peripheral (MFP). The typical calibration method corrects input-output characteristics such that a color value of an output color becomes a target color value, by measuring a current output color using a scanner attached to an MFP or a print density sensor inside an image forming apparatus.

SUMMARY

A calibration system according to one aspect of the disclosure includes an imaging device, an image forming apparatus, and a table generating unit. The image forming apparatus generates a sheet by printing a test chart including patches of a plurality of colors. The table generating unit generates a gamma correction table for correcting tone characteristics of the image forming apparatus to the tone characteristics in accordance with a preliminary prepared reference chart corresponding to the test chart. The table generating unit: calculates a first weighting coefficient based on dispersion of color values of pixels inside the patch in a captured image for each of the patches where the captured image is generated by simultaneously capturing the test chart of the sheet and the reference chart with the imaging device; calculates a second weighting coefficient based on prediction lightness of the patch in the captured image for each of the patches assuming that the patch is a blank part, and then calculates a representative value for each tone of the color value of each of the patches in the test chart and the reference chart based on an average of a weighted average of the color value of the plurality of patches based on the first weighting coefficient and a weighted average of the color value of the plurality of patches based on the second weighting coefficient; and generates the gamma correction table based on the respective representative values in the test chart and the reference chart.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
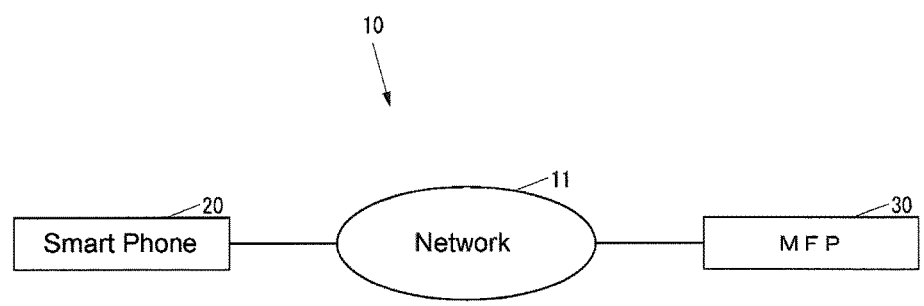
FIG. 1 illustrates a calibration system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to the accompanying drawings.

First, a description will be given of a configuration of a calibration system according to the embodiment.

FIG. 1 illustrates a calibration system 10 according to the embodiment.

As illustrated in FIG. 1, the calibration system 10 includes a smart phone 20 as an imaging device and a Multifunction Peripheral (MFP) 30 as an image forming apparatus. The smart phone 20 and the MFP 30 may be communicated with one another. Here, the smart phone 20 and the MFP 30 may be communicable with one another via a network 11 such as a Local Area Network (LAN) or the Internet, and, may be directly communicable with one another, without via the network 11, but via a communication cable such as a Universal Serial Bus (USB) cable.

Figure 2:
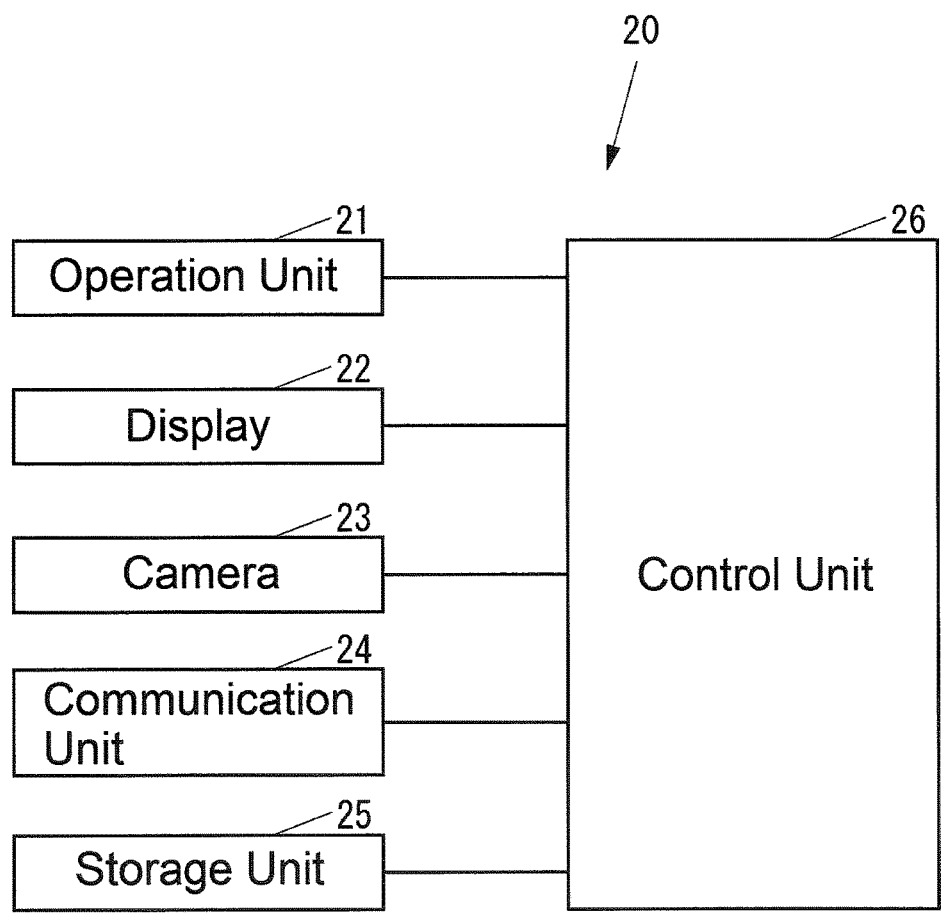
FIG. 2 illustrates a smart phone according to the one embodiment.

FIG. 2 illustrates the smart phone 20.

As illustrated in FIG. 2, the smart phone 20 includes the following: an operation unit 21 that is an input device such as a button for inputting various kinds of operations; a display 22 that is a display device such as a Liquid Crystal Display (LCD) displaying various kinds of information; a camera 23; a communication unit 24 that is a communication device communicating with an external device via the network 11 (see FIG. 1) or the communication cable; a storage unit 25 that is a non-volatile storage device such as a semiconductor memory storing various kinds of data; and a control unit 26 that controls the whole smart phone 20.

The control unit 26 includes, for example, a Central Processing Unit (CPU), a Read Only Memory (ROM) storing various kinds of data, and a Random Access Memory (RAM) used as a work area for the CPU of the control unit 26. The CPU of the control unit 26 executes programs stored in the ROM of the control unit 26 or the storage unit 25.

Figure 3:
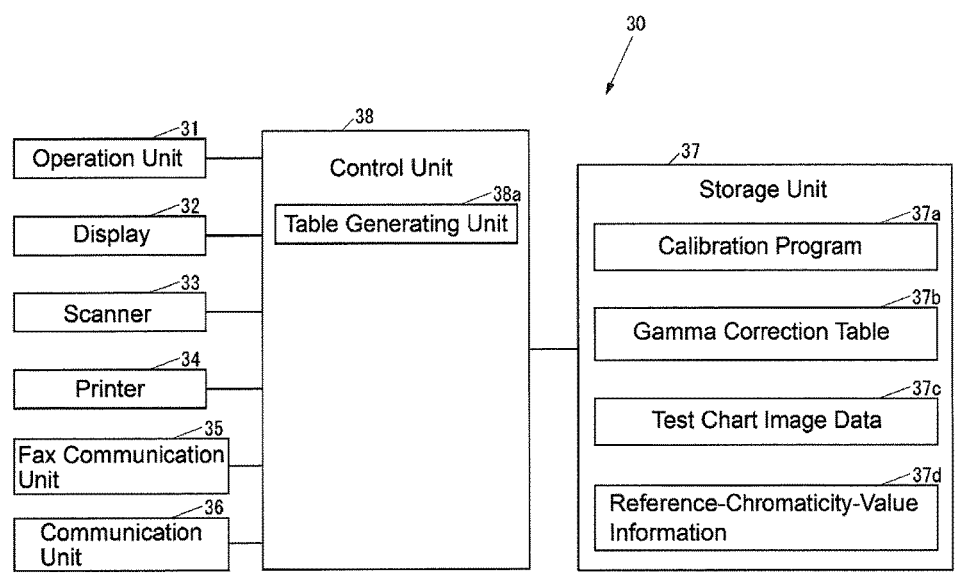
FIG. 3 illustrates an MFP according to the one embodiment.

FIG. 3 illustrates an MFP 30.

As illustrated in FIG. 3, the MFP 30 includes an operation unit 31, a display 32, a scanner 33, a printer 34, a fax communication unit 35, a communication unit 36, a storage unit 37, and a control unit 38 controlling the whole MFP 30. The operation unit 31 is an input device such as a button for inputting various kinds of operations. The display 32 is a display device such as an LCD that displays various kinds of information. The scanner 33 is a reading device that reads an image from a document. The printer 34 is a print device that executes a print job onto a recording medium such as a paper sheet. The fax communication unit 35 is a fax device that performs fax communication with an external facsimile device (not illustrated) via a communication line such as a dial-up line. The communication unit 36 is a communication device that communicates with an external device via the network 11 (see FIG. 1) or the communication cable. The storage unit 37 is a non-volatile storage device such as a semiconductor memory or a Hard Disk Drive (HDD) that stores various kinds of data.

The storage unit 37 stores a calibration program 37a for correction of tone characteristics of the printer 34. The calibration program 37a may be installed in the MFP 30 at production stage of the MFP 30, or may be additionally installed in the MFP 30 from a storage medium such as a SD card or a Universal Serial Bus (USB) memory, or may be additionally installed in the MFP 30 on the network 11 (see FIG. 1).

The storage unit 37 stores a gamma correction table (Lookup Table: LUT) 37b for correction of tone characteristics of the MFP 30.

Figure 4:
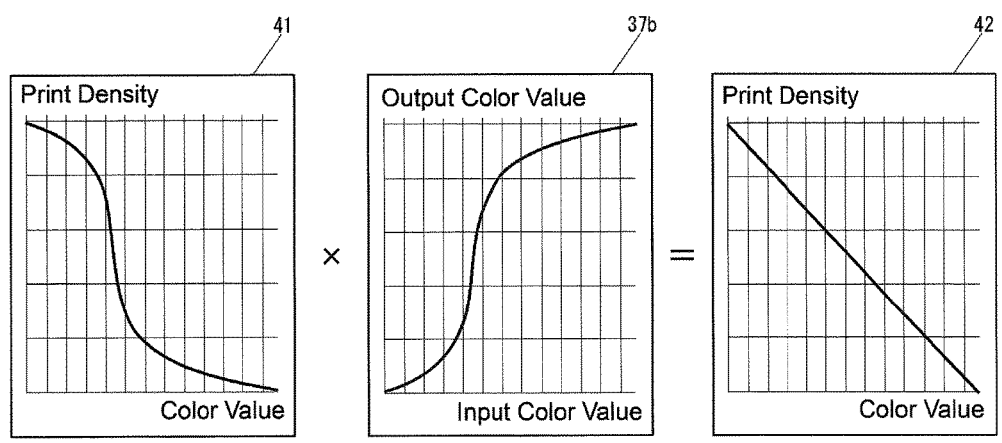
FIG. 4 illustrates a principle of a gamma correction table according to the one embodiment.

FIG. 4 illustrates a principle of the gamma correction table 37b.

As illustrated in FIG. 4, even when actual tone characteristics 41 of the printer 34 is displaced from expected tone characteristics 42, applying the gamma correction table 37b to the actual tone characteristics 41 of the printer 34 ensures the expected tone characteristics 42.

As illustrated in FIG. 3, the storage unit 37 stores the following: test chart image data 37c as image data of a test chart that includes patches of a plurality of colors; and reference-chromaticity-value information 37d that indicates a chromaticity value of each patch in an reference chart where a device-independent chromaticity value is already known with respect to the patch.

The following describes the device-independent chromaticity value as a XYZ value.

Figure 5A:
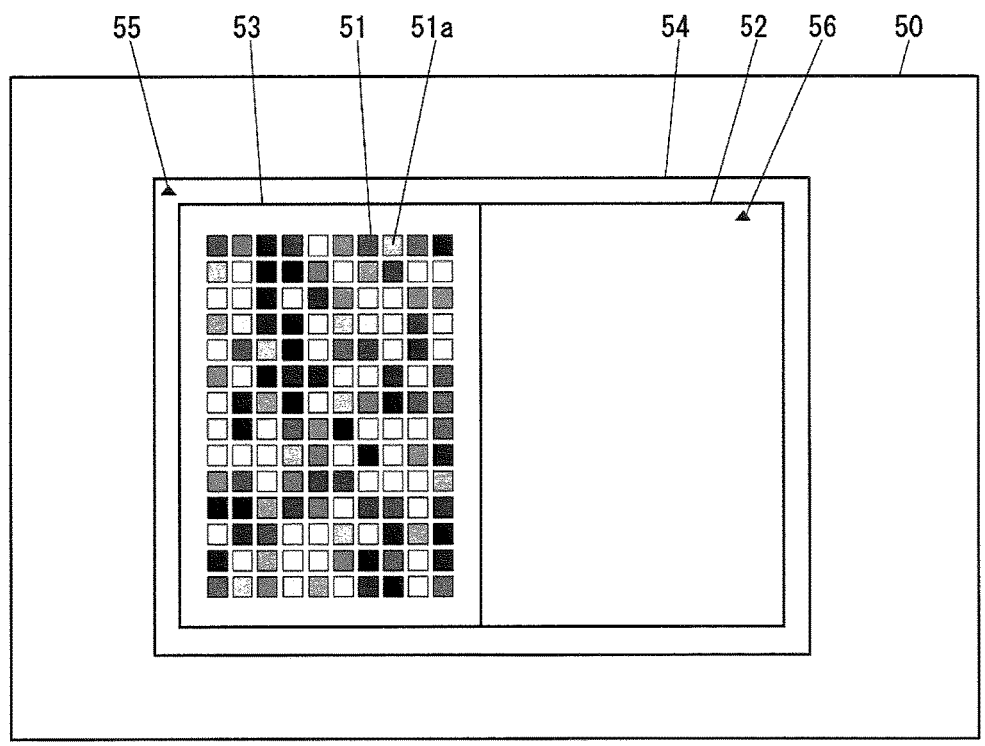
FIG. 5A illustrates an exemplary test sheet printed based on test chart image data according to the one embodiment.
Figure 5B:
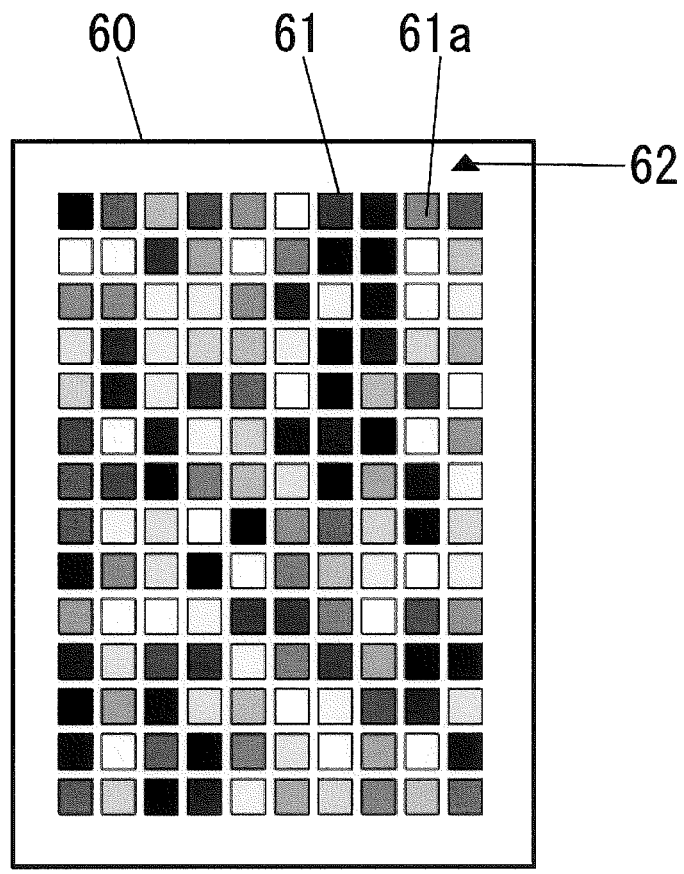
FIG. 5B illustrates an exemplary reference sheet used together with the test sheet according to the one embodiment.

FIG. 5A illustrates one example of a test sheet 50 as a sheet that is printed based on the test chart image data 37c. FIG. 5B illustrates one example of a reference sheet 60 used together with the test sheet 50.

As illustrated in FIG. 5A, the test sheet 50 is a sheet on which the following are printed with the printer 34: a test chart 51 as a chart including patches 51a of a plurality of colors; a frame border 52 indicating a position where the reference sheet 60 is arranged; a frame border 53 surrounding the test chart 51; and a frame border 54 surrounding the frame border 52 and the frame border 53. On the test sheet 50 printed are a triangular shape 55 indicative of a direction of the test chart 51 and a triangular shape 56 indicative of a direction where the reference sheet 60 is to be arranged.

The reference sheet 60 is a sheet where a reference chart 61 including patches 61a of a plurality of colors, and a triangular shape 62 indicative of a direction of the reference chart 61 are drawn. The reference chart 61 is similar to the horizontally reversed test chart 51 and a chart that corresponds to the test chart 51. The reference chart 61 is not a chart that is printed with the printer 34, and thus accuracy is excellent with regard to a color value compared to the test chart 51.

The control unit 38 illustrated in FIG. 3 includes, for example, a CPU, a ROM storing programs and various kinds of data, and a RAM used as the work area of the CPU of the control unit 38. The CPU of the control unit 38 executes the program stored in the ROM of the control unit 38 or in the storage unit 37.

By executing the calibration program 37a stored in the storage unit 37, the control unit 38 functions as a table generating unit 38a that generates the gamma correction table 37b for correcting the tone characteristics of the MFP 30 to tone characteristics in accordance with the reference chart 61 (see FIGS. 5A and 5B).

Next, a description will be given of a calibration method in the calibration system 10.

Figure 6:
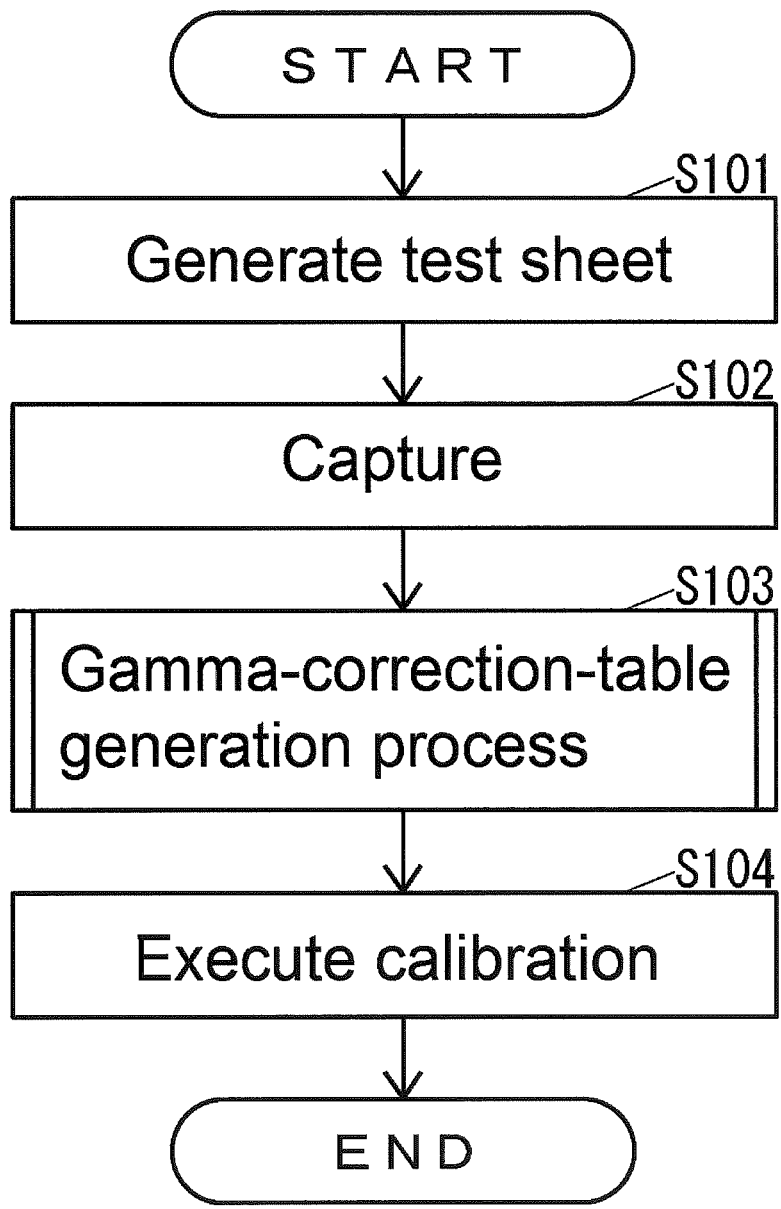
FIG. 6 illustrates a calibration method in the calibration system according to the one embodiment.

FIG. 6 illustrates the calibration method in the calibration system 10.

A user instructs the MFP 30 to generate the test sheet 50 via the operation unit 31 of the MFP 30 or similar unit. Consequently, by executing the calibration program 37a stored in the storage unit 37, the control unit 38 of the MFP 30 generates the test sheet 50 by printing the test chart 51 with the printer 34, as illustrated in FIG. 6 (Step S101).

Figure 7:
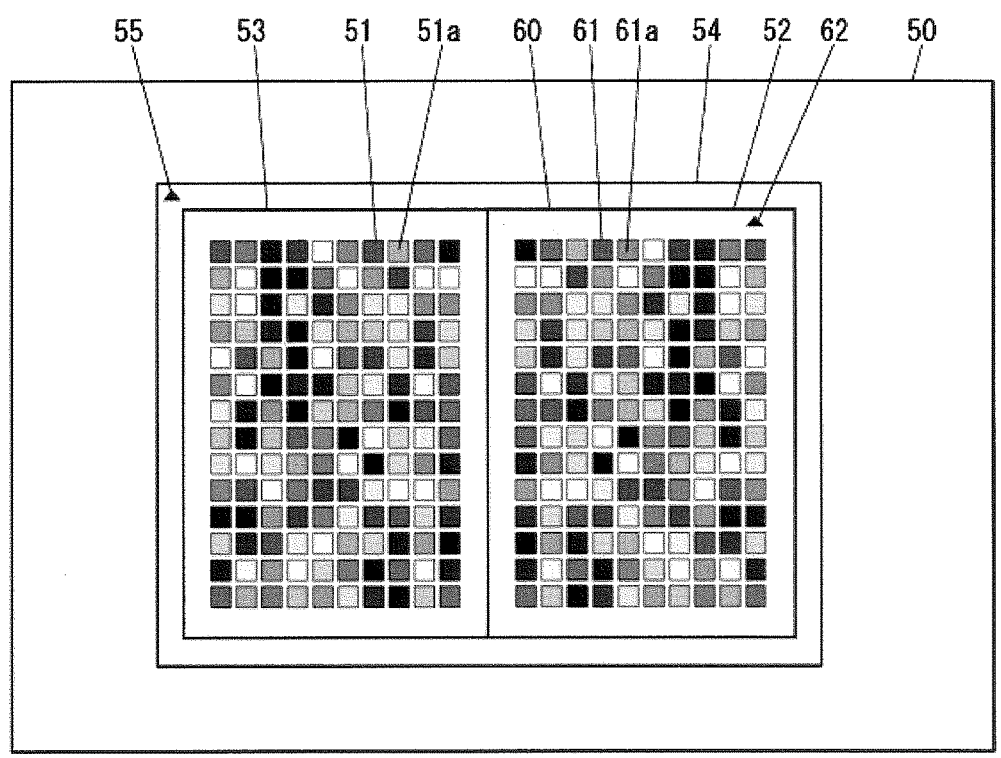
FIG. 7 illustrates one example of a test sheet and a reference sheet according to the one embodiment, in a state where the reference sheet is arranged within a frame border of the test sheet.

After the process at Step S101, in the state where the reference sheet 60 is arranged within the frame border 52 of the test sheet 50 as illustrated in FIG. 7, a user captures the test sheet 50 with the camera 23 in the smart phone 20 as illustrated in FIG. 6 (Step S102). Consequently, the smart phone 20 simultaneously captures the test chart 51 and the reference chart 61, and thus generates an image (hereinafter referred to as "a captured image"), and then transmits the generated captured image to the MFP 30.

Figure 8:
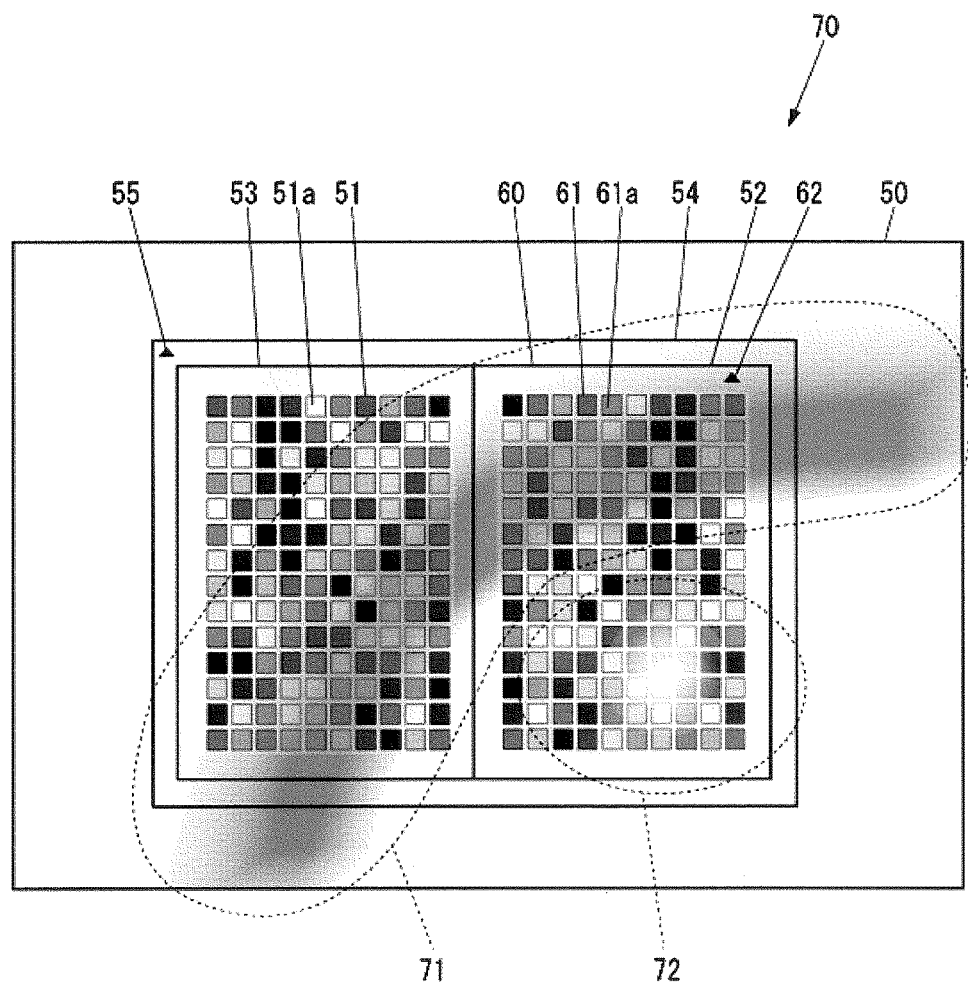
FIG. 8 illustrates an exemplary captured image generated by the smart phone according to the one embodiment.

FIG. 8 illustrates one example of a captured image 70 generated at Step S102.

As illustrated in FIG. 8, the captured image 70 includes the test sheet 50 and the reference sheet 60 in a state where the reference sheet 60 is arranged within the frame border 52 of the test sheet 50.

Mottle of lightness is occurring in the captured image 70 illustrated in FIG. 8. For example, there have occurred a region 71 where lightness becomes lower due to reflection of a shadow of some sort of an object such as a photographer and a region 72 where lightness becomes higher due to occurrence of halation in the captured image 70.

Figure 9:
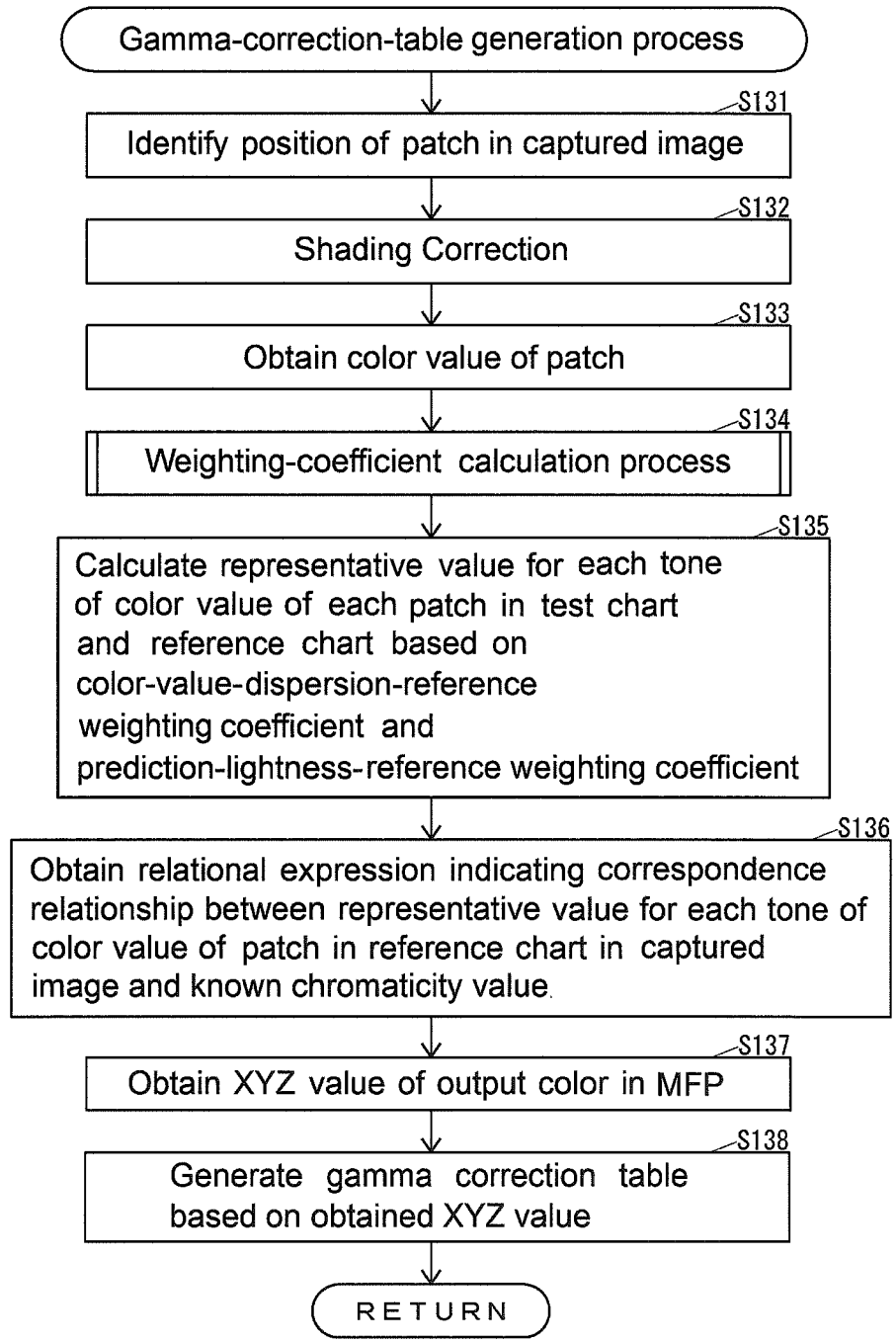
FIG. 9 illustrates a gamma-correction-table generation process according to the one embodiment.

As illustrated in FIG. 6, after the process at Step S102, the table generating unit 38a of the MFP 30 executes the gamma-correction-table generation process illustrated in FIG. 9 based on the captured image transmitted from the smart phone 20 (Step S103).

FIG. 9 illustrates the gamma-correction-table generation process illustrated in FIG. 6.

As illustrated in FIG. 9, the table generating unit 38a identifies each position of the patches in the chart in the captured image by image processing (Step S131).

Next, the table generating unit 38a performs a shading correction on the captured image (Step S132).

Next, the table generating unit 38a obtains a color value with respect to each patch the position of which has been identified at Step S131 (Step S133).

Here, when obtaining the color value from the patch in the captured image, obtaining the color value from pixels in the whole region of the patch is likely to cause the table generating unit 38a to obtain erroneously the color value of the pixel outside the patch when obtaining the color value of the pixel in the region near the outline of the patch. Consequently, when obtaining the color value from the patch in the captured image, the table generating unit 38a avoids the region near the outline of the patch and obtains only the color value of the pixel in the specific region near the center (hereinafter referred to as "a near-center region") of the patch.

Figure 10:
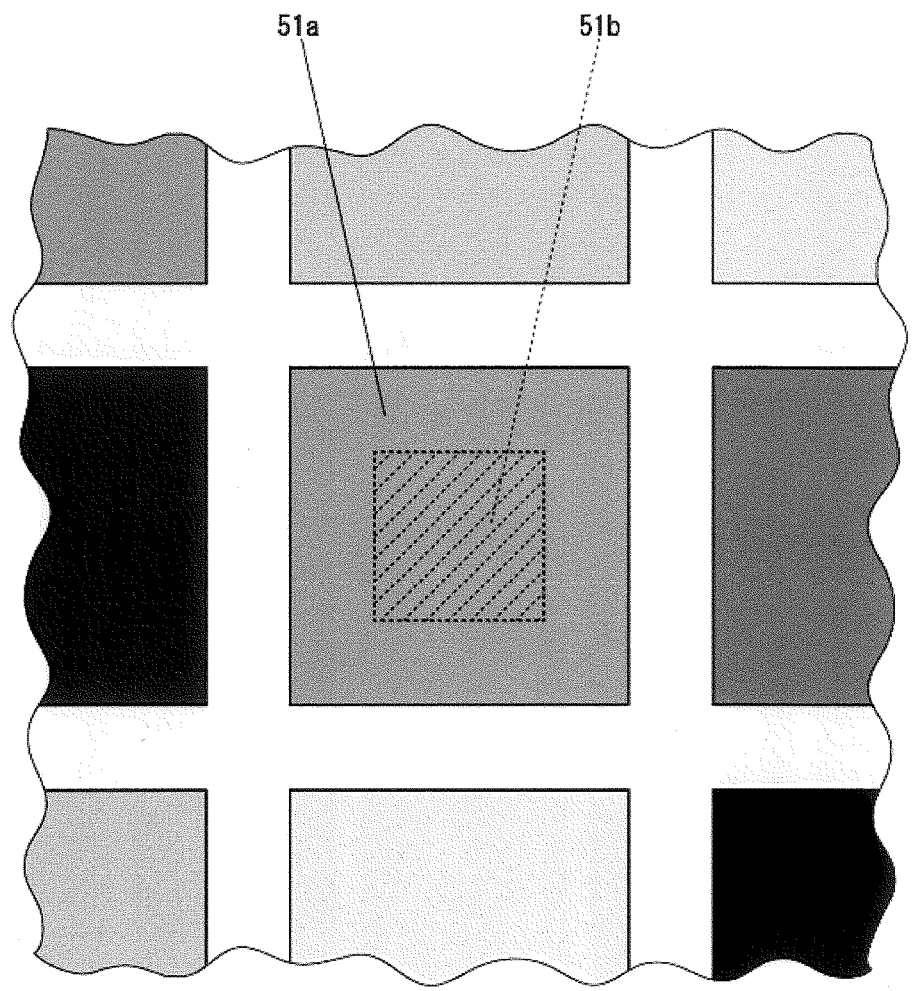
FIG. 10 illustrates an exemplary near-center region of a patch in a test chart according to the one embodiment.

Specifically, as illustrated in FIG. 10, when obtaining the color value from the patch 51a in the captured image, the table generating unit 38a obtains only the color values of the pixels in a near-center region 51b of the patch 51a and obtains an average value of the obtained color values of the pixels as the color value of the patch 51a. The near-center region 51b is a region where, for example, the respective longitudinal and lateral lengths are half with respect to the whole region of the patch 51a. The patch 51a has been described, and the same applies to the patch 61a.

The following describes the color value in the captured image as an RGB value.

After the process at Step S133, the table generating unit 38a executes a weighting-coefficient calculation process that calculates a weighting coefficient for calculation of a representative value for each tone of the color value of each patch in the test chart 51 and the reference chart 61 in the captured image (Step S134).

Figure 11:
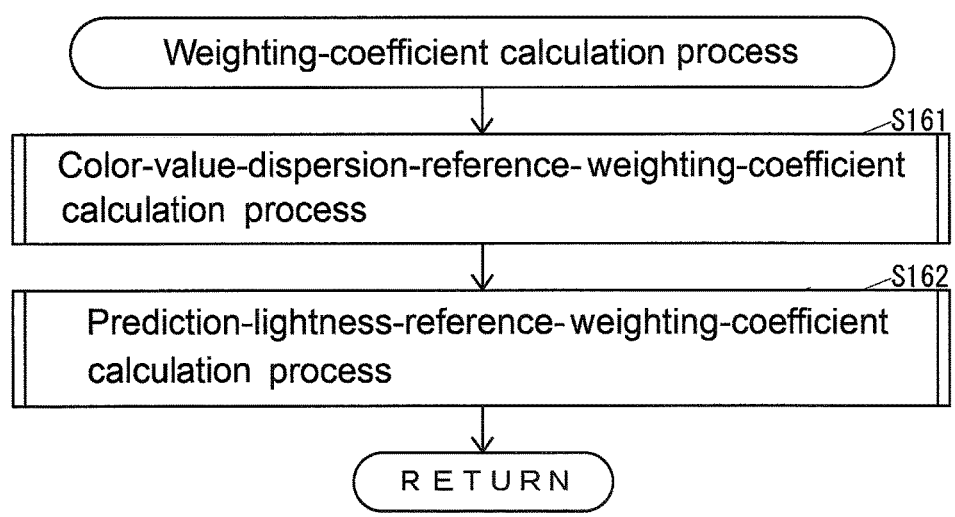
FIG. 11 illustrates a weighting-coefficient calculation process according to the one embodiment.

FIG. 11 illustrates the weighting-coefficient calculation process illustrated in FIG. 9.

As illustrated in FIG. 11, the table generating unit 38a executes a color-value-dispersion-reference-weighting-coefficient calculation process that calculates a color-value-dispersion-reference weighting coefficient as a first weighting coefficient based on dispersion of the color value of the pixel inside the patch in the captured image (Step S161).

Figure 12:
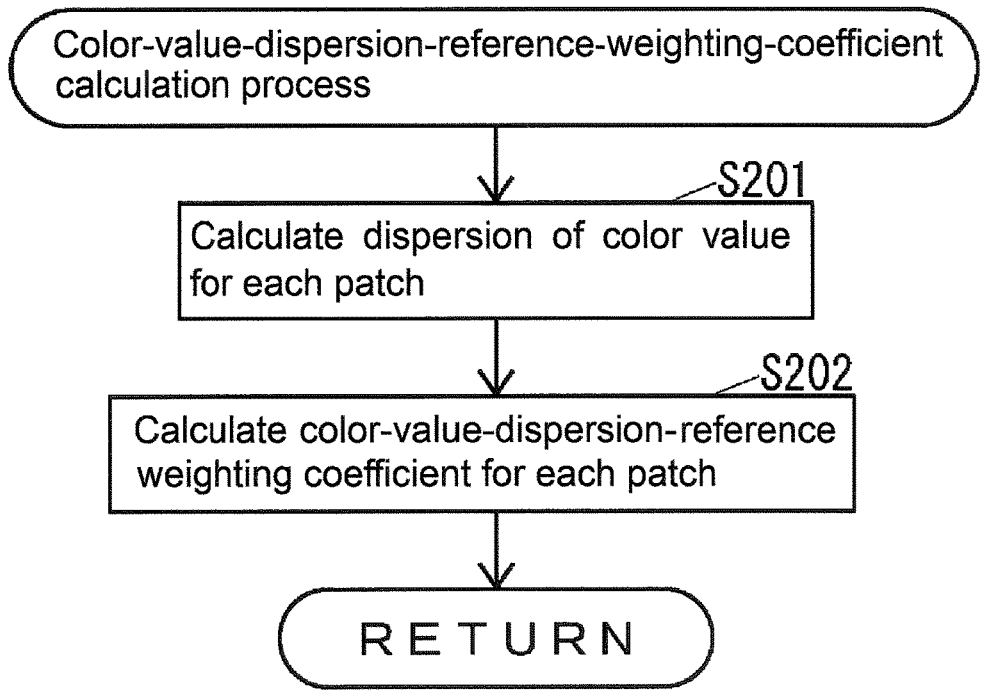
FIG. 12 illustrates a color-value-dispersion-reference-weighting-coefficient calculation process according to the one embodiment.

FIG. 12 illustrates the color-value-dispersion-reference-weighting-coefficient calculation process illustrated in FIG. 11.

As illustrated in FIG. 12, the table generating unit 38a calculates the dispersion of the color value of the pixel inside the patch in the captured image for each patch as indicated by Formula 1 (Step S201). In Formula 1, S' denotes the dispersion of the RGB value of the target patch. $rgb_n$ denotes the RGB value of each pixel inside the near-center region of the target patch. The suffix n of $rgb_n$ is, for example, an integer of N kinds equal to or more than 1 and equal to or less than N for identifying the value of which pixel in the near-center region of the patch $rgb_n$ is. N denotes a pixel number inside the near-center region of the target patch. $Rgb_{ave}$ denotes an average value of the RGB value of each pixel inside the near-center region of the target patch.

$$S' = \frac{\sum_{n=1}^{N}(rgb_n - rgb_{ave})^2}{N-1} \quad \text{[Formula 1]}$$

Next, the table generating unit 38a calculates the color-value-dispersion-reference weighting coefficient using the dispersion calculated at Step S201 for each patch as indicated by Formula 2 (Step S202). In Formula 2, Scatter-Weight denotes the color-value-dispersion-reference weighting coefficient of the target patch. S' denotes the dispersion of the RGB value of the target patch. $S_{ave}$ denotes an average value of the dispersion S' of the RGB values of all the patches in the captured image. abs( ) denotes a function that obtains an absolute value of a numerical value inside 0.

$$ScatterWeight = \frac{1}{abs(S' - S_{ave})} \quad \text{[Formula 2]}$$

In Formula 2, ScatterWeight becomes extremely large when abs(S'–$S_{ave}$) is close to 0. Consequently, an upper limit value may be set to ScatterWeight.

After the process at Step S202, the table generating unit 38a terminates the color-value-dispersion-reference-weighting-coefficient calculation process illustrated in FIG. 12.

As illustrated in FIG. 11, after the color-value-dispersion-reference-weighting-coefficient calculation process at Step S161, the table generating unit 38a executes a prediction-lightness-reference-weighting-coefficient calculation process that calculates a prediction-lightness-reference weighting coefficient as a second weighting coefficient based on prediction lightness of the patch in the captured image when a patch in the captured image is assumed to be a blank part (Step S162).

Figure 13:
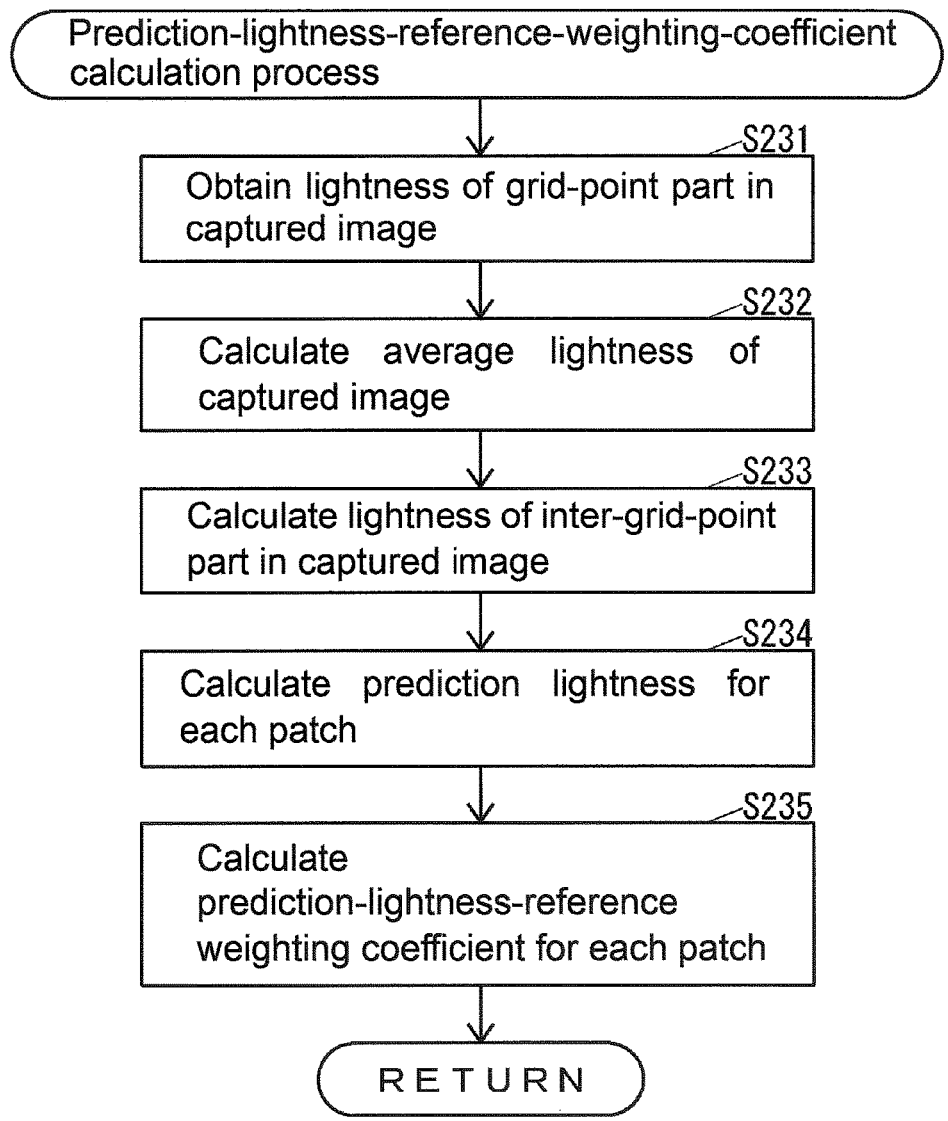
FIG. 13 illustrates a prediction-lightness-reference-weighting-coefficient calculation process according to the one embodiment.

FIG. 13 illustrates the prediction-lightness-reference-weighting-coefficient calculation process illustrated in FIG. 11.

Figure 14:
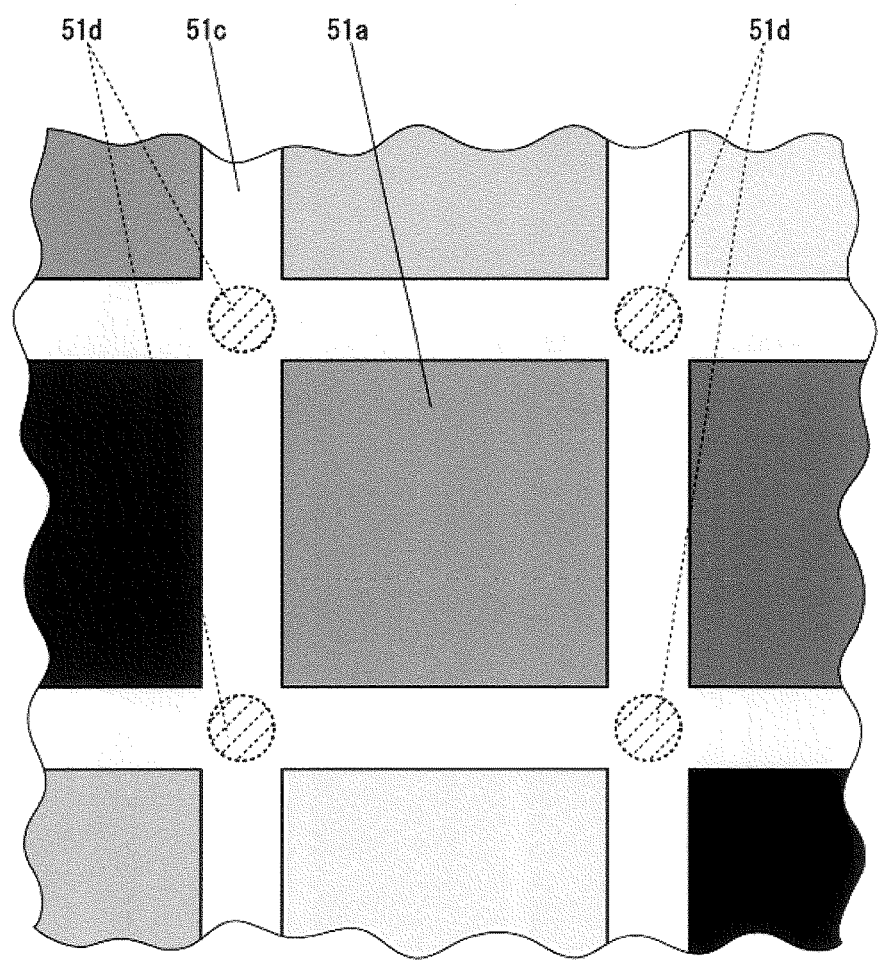
FIG. 14 illustrates an exemplary grid-point part in the test chart according to the one embodiment.

As illustrated in FIG. 13, the table generating unit 38a obtains lightness of a grid part formed between the patches in the captured image, namely a part of a grid point (hereinafter referred to as "a grid-point part") among the blank parts (Step S231). For example, as illustrated in FIG. 14, the table generating unit 38a obtains lightness of grid-point parts 51d of a grid part 51c formed between the patches 51a in the captured image. The patch 51a has been described, and the same applies to the patch 61a. The test sheet 50 is generated by the test chart 51 printed on a white-colored recording medium. Consequently, the grid part 51c of the test chart 51 in the test sheet 50 is white in color. The grid part of the reference chart 61 in the reference sheet 60 is also white in color.

After the process at Step S231, the table generating unit 38a calculates an average value of the lightness of the captured image, namely average lightness based on the lightness of the grid-point part obtained at Step S231 (Step S232). That is, the table generating unit 38a calculates the average lightness of the captured image by averaging the lightness of the plurality of grid-point parts obtained at Step S231.

Figure 15:
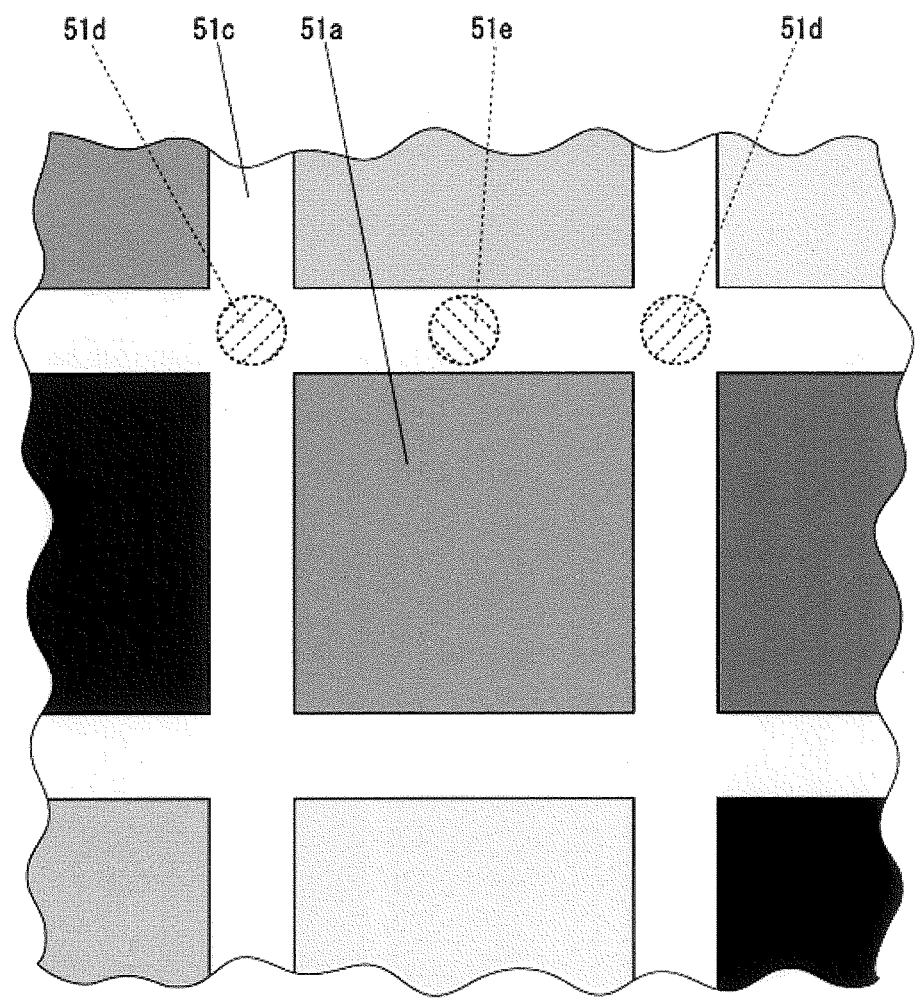
FIG. 15 illustrates an exemplary inter-grid-point part in the test chart according to the one embodiment.

After the process at Step S232, the table generating unit 38a calculates the lightness of a part between the grid points (hereinafter referred to as "an inter-grid-point part") of the chart in the captured image by linear interpolation based on the lightness of the grid-point part obtained at Step S231 (Step S233). For example, as illustrated in FIG. 15, when the lightness of the adjacent grid-point parts 51d in the grid part 51c formed between the patches 51a in the captured image are 80 and 100, respectively, the table generating unit 38a calculates lightness of an inter-grid-point part 51e located between these grid-point parts 51d as 90, which is an average of the lightness of these grid-point parts 51d. The patch 51a has been described, and the same applies to the patch 61a.

Figure 16:
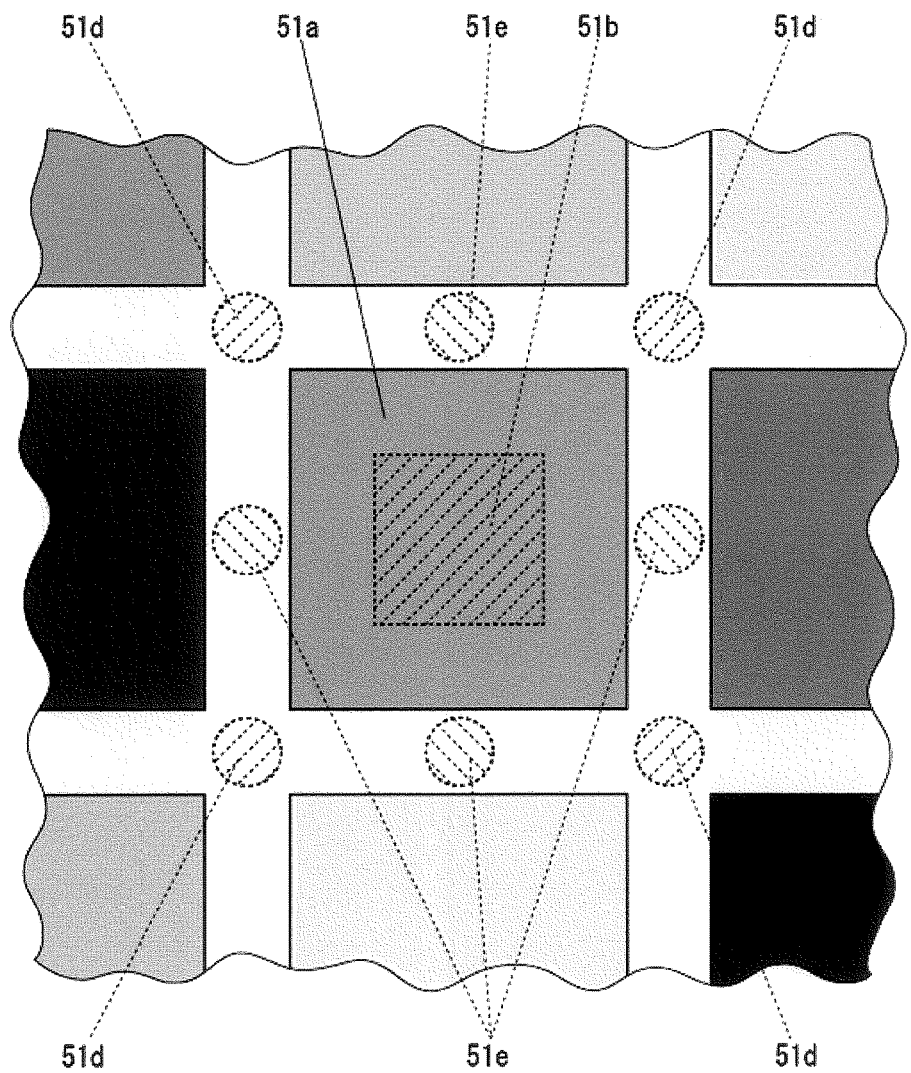
FIG. 16 illustrates one example of the near-center region, the grid-point part and the inter-grid-point part of the patch in the test chart according to the one embodiment.

After the process at Step S233, the table generating unit 38a calculates the prediction lightness of the patch in the captured image when the patch in the captured image is assumed to be a blank part, namely a white-colored part, for each patch based on the lightness of the grid-point part obtained at Step S231 and the lightness of the inter-grid-point part calculated at Step S233 (Step S234). That is, as illustrated in FIG. 16, the table generating unit 38a predicts the lightness of the patch 51a in the captured image when the patch 51a, which is surrounded by the four closest grid-point parts 51d and the four closest inter-grid-point parts 51e in the captured image, is assumed to be the blank part, namely the white-colored part.

Specifically, the table generating unit 38a, first, as indicated by Formula 3, calculates an inverse number $W_{n,k}$ that is a distance from any of the four grid-point parts 51d and the four closest inter-grid-point parts 51e, for each pixel in the near-center region 51b in the patch 51a. In Formula 3, $X_k$ and $Y_k$ denote X- and Y-coordinates of any of the four grid-point parts 51d and the four inter-grid-point parts 51e, respectively. $X_n$ and $y_n$ denote X- and Y-coordinates of the target pixel, respectively. The suffix k of $W_{n,k}$, $X_k$, and $Y_k$ is, for example, the integer of 8 kinds equal to or more than 1 and equal to or less than 8 for identifying which values of the four grid-point parts 51d and the four inter-grid-point parts 51e $W_{n,k}$, $X_k$, and $Y_k$ are. The suffix n of $W_{n,k}$, $x_n$, and $y_n$ is, for example, the integer of N kinds equal to or more than 1 and equal to or less than N for identifying the values of which pixel in the near-center region 51b in the patch 51a $W_{n,k}$, $x_n$, and $y_n$ are. N denotes the pixel number in the near-center region 51b.

$$W_{n,k} = \frac{1}{\sqrt{(X_k - x_n)^2 + (Y_k - y_n)^2}} \quad \text{[Formula 3]}$$

Next, as indicated in Formula 4, the table generating unit 38a calculates the prediction lightness $l_n$ of the pixel when the target pixel is assumed to be a blank part, for each pixel in the near-center region 51b in the patch 51a. In Formula 4, $W_{n,k}$ is the one calculated in Formula 3. $L_k$ denotes the lightness any of the four grid-point parts 51d and the four inter-grid-point parts 51e, and is any of the lightness obtained at Step S231 and the lightness calculated at Step S233. The suffix k of $W_{n,k}$ and $L_k$ is, for example, the integer of 8 kinds equal to or more than 1 and equal to or less than 8 for identifying which values of the four grid-point parts 51d and the four inter-grid-point parts 51e $W_{n,k}$ and $L_k$ are. The suffix n of $W_{n,k}$ and $l_n$ is, for example, the integer of N kinds equal to or more than 1 and equal to or less than N for identifying the values of which pixel in the near-center region 51b in the patch 51a $W_{n,k}$ and $l_n$ are. N denotes the pixel number in the near-center region 51b. Formula 4 indicates an interpolation method referred to as an Inverse distance weighted method, and indicates the interpolation method where the lightness of the closer position from the target pixel causes larger influence to the prediction lightness of the target pixel.

$$I_n = \sum_{k=1}^{8} \left( \frac{W_{n,k}}{\sum_{k=1}^{8} W_{n,k}} \times L_k \right) \quad \text{[Formula 4]}$$

Next, as indicated by Formula 5, the table generating unit 38a calculates the prediction lightness L' of the patch 51a in the captured image for each patch 51a when the patch 51a in the captured image is assumed to be a blank part. In Formula 5, $l_n$ is the one calculated in Formula 4. N denotes the pixel number in the near-center region 51b.

$$L' = \frac{\sum_{n=1}^{N} I_n}{N} \quad \text{[Formula 5]}$$

The patch 51a has been described above, and the same applies to the patch 61a.

After the process at Step S234, the table generating unit 38a calculates the prediction-lightness-reference weighting coefficient for each patch using the prediction lightness calculated at Step S234 as indicated by Formula 6 (Step S235). In Formula 6, LightWeight denotes the prediction-lightness-reference weighting coefficient of the target patch. L' denotes the prediction lightness of the target patch. $L_{ave}$ denotes the average value of the prediction lightness L' of all the patches in the captured image. abs( ) denotes a function that obtains an absolute value of a numerical value inside 0.

$$LightWeight = \frac{1}{\text{abs}(L' - L_{ave})} \quad \text{[Formula 6]}$$

In Formula 6, LightWeight becomes extremely large when abs(L'−$L_{ave}$) is close to 0. Consequently, an upper limit value may be set to LightWeight.

After the process at Step S235 terminates, the table generating unit 38a terminates the prediction-lightness-reference-weighting-coefficient calculation process illustrated in FIG. 13.

As illustrated in FIG. 11, after the prediction-lightness-reference-weighting-coefficient calculation process at Step S162, the table generating unit 38a terminates the weighting-coefficient calculation process illustrated in FIG. 11.

As illustrated in FIG. 9, after the weighting-coefficient calculation process at Step S134, the table generating unit 38a calculates a representative value for each tone of the color value of each patch in the test chart 51 and the reference chart 61, based on the color-value-dispersion-reference weighting coefficient calculated by the weighting-coefficient calculation process at Step S134 and the prediction-lightness-reference weighting coefficient (Step S135).

Specifically, the table generating unit 38a, first, as indicated by Formula 7, calculates a weighted average $RGB_s$ of the color value of the plurality of patches based on the color-value-dispersion-reference weighting coefficient, for each tone of the color value of each patch in the test chart 51 and the reference chart 61. That is, the table generating unit 38a calculates the weighted average $RGB_s$ for each tone of the color value of the patch 51a in the test chart 51 and also calculates the weighted average $RGB_s$ for each tone of the color value of the patch 61a in the reference chart 61. In Formula 7, $ScatterWeight_m$ denotes the color-value-dispersion-reference weighting coefficient for each patch calculated at Step S202. $RGB_m$ denotes the lightness for each patch obtained at Step S133. The suffix m of $ScatterWeight_m$ and $RGB_m$ is, for example, the integer of M kinds equal to or more than 1 and equal to or less than M for identifying the values of which patch among the plurality of patches with identical tone in each of the test chart 51 and the reference chart 61 $ScatterWeight_m$ and $RGB_m$ are. M denotes the number of the plurality of patches with the identical tone in each of the test chart 51 and the reference chart 61. For example, when the table generating unit 38a calculates the weighted average $RGB_s$ for specific tone of the color value of the patch 51a in the test chart 51, M in this case is 4 when the number of the patch 51a with this tone in the test chart 51 is 4

$$RGB_s = \frac{\sum (ScatterWeight_m \times RGB_m)}{\sum ScatterWeight_m} \quad \text{[Formula 7]}$$

Next, as indicated by Formula 8, the table generating unit 38a calculates a weighted average $RGB_l$ of the color value of the plurality of patches based on the prediction-lightness-reference weighting coefficient, for each tone of the color value of each patch in the test chart 51 and the reference chart 61. That is, the table generating unit 38a calculates the weighted average $RGB_l$ for each tone of the color value of the patch 51a in the test chart 51 and also calculates the weighted average $RGB_l$ for each tone of the color value of the patch 61a in the reference chart 61. In Formula 8, $LightWeight_m$ denotes the prediction-lightness-reference weighting coefficient for each patch calculated at Step S235. $RGB_m$ denotes the lightness for each patch obtained at Step S133. The suffix m of $LightWeight_m$ and $RGB_m$ is, for example, the integer of M kinds equal to or more than 1 and equal to or less than M for identifying the values of which patch among the plurality of patches with identical tone in each of the test chart 51 and the reference chart 61 Light-Weight$_m$ and $RGB_m$ are. M denotes the number of the plurality of patches with the identical tone in each of the test chart 51 and the reference chart 61. For example, when the table generating unit 38a calculates the weighted average $RGB_l$ for specific tone of the color value of the patch 51a in the test chart 51, M in this case is 4 when the number of the patch 51a with this tone in the test chart 51 is 4

$$RGB_l = \frac{\sum (LightWeight_m \times RGB_m)}{\sum LightWeight_m} \quad \text{[Formula 8]}$$

Next, as indicate by Formula 9, the table generating unit 38a calculates an average RGB as a representative value for each tone of the color value for each patch in the test chart 51 and the reference chart 61. The average RGB is an average value between the weighted average $RGB_s$ calculated by Formula 7 for each tone of the color value for each patch in the test chart 51 and the reference chart 61 and the weighted average $RGB_l$ calculated by Formula 8 for each tone of the color value for each patch in the test chart 51 and the reference chart 61. That is, the table generating unit 38a calculates the representative value for each tone of the color value of the patch 51a in the test chart 51 and also calculates the representative value for each tone of the color value of the patch 61a in the reference chart 61.

$$RGB = \frac{RGB_s + RGB_l}{2} \quad \text{[Formula 9]}$$

Figure 17:
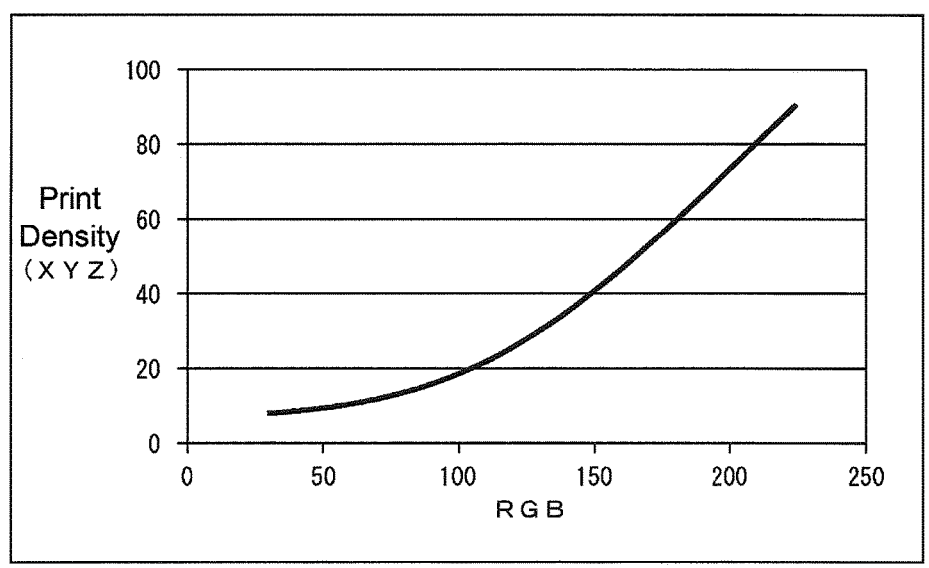
FIG. 17 illustrates an exemplary relational expression generated in the gamma-correction-table generation process according to the one embodiment.

After the process at Step S135, the table generating unit 38a obtains a relational expression that indicates a correspondence relationship between the representative value for each tone of the RGB value of the patch 61a in the reference chart 61 calculated at Step S135 and a known XYZ value, as illustrated in FIG. 17 (Step S136). Here, the table generating unit 38a obtains each known XYZ value of the patch 61a in the reference chart 61 based on the reference-chromaticity-value information 37d. Consequently, the table generating unit 38a recognizes to which XYZ value the representative value for each tone of the RGB value in the captured image corresponds, respectively, based on a positional relationship of the plurality of patches 61a in the reference chart 61.

Figure 18:
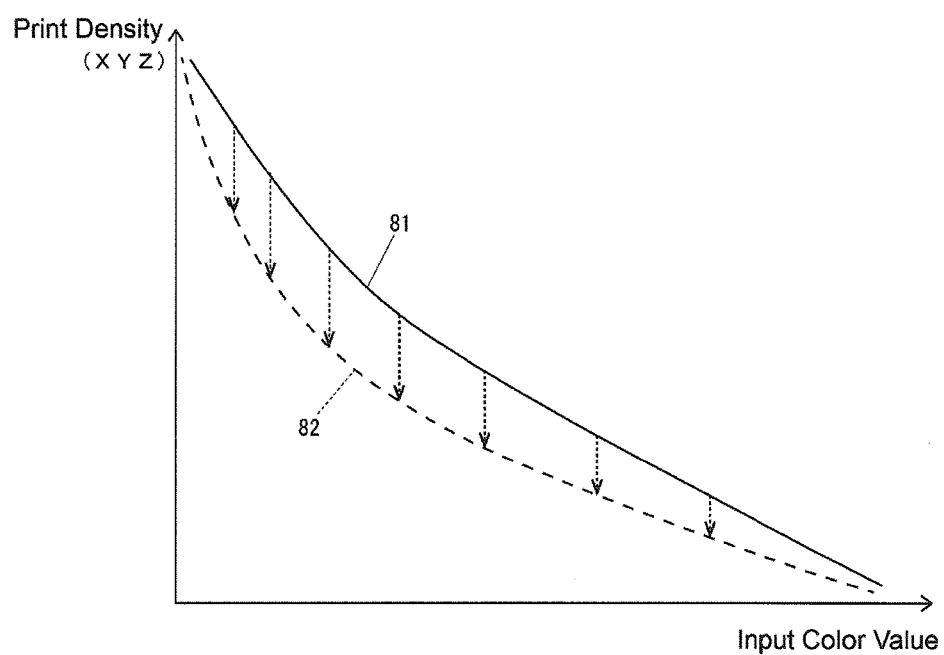
FIG. 18 illustrates exemplary tone characteristics of the MFP according to the one embodiment.

After the process at Step S136, the table generating unit 38a obtains the XYZ value of the output color by the MFP 30 for the patch 51a in the test chart 51, by substituting the representative value for each tone of the RGB value of the patch 51a in the test chart 51 calculated at Step S135 into the relational expression obtained at Step S136 (Step S137). Consequently, as illustrated in FIG. 18, the table generating unit 38a obtains tone characteristics 81 of the MFP 30. The tone characteristics 81 is a relationship between the color value in the test chart image data 37c with respect to the patch 51a in the test chart 51, namely an input color value, and the XYZ value obtained at Step S137 with respect to the tone of this patch 51a. As illustrated in FIG. 18, the table generating unit 38a obtains a relationship 82 between the color value in the test chart image data 37c with respect to the patch 51a in the test chart 51, namely the input color value and the XYZ value set in the reference-chromaticity-value information 37d with respect to the patch 61a in the reference chart 61 corresponding to this patch 51a.

After the process at Step S137, the table generating unit 38a generates the gamma correction table correcting the tone characteristics 81 of the MFP 30 to the relationship 82 in the reference chart 61, as arrows illustrated in FIG. 18 (Step S138). That is, the table generating unit 38a generates the gamma correction table correcting the tone characteristics 81 of the MFP 30 to the tone characteristics in accordance with the reference chart 61 based on the difference between the XYZ value of the output color by the MFP 30 for the patch 51*a* in the test chart 51 and the known XYZ of the patch 61*a* in the reference chart 61.

After terminating the process at Step S138, the table generating unit 38*a* terminates the gamma-correction-table generation process illustrated in FIG. 9.

As illustrated in FIG. 6, after the gamma-correction-table generation process at Step S103, the control unit 38 executes calibration by executing the calibration program 37*a* and updating the gamma correction table 37*b* on the storage unit 37 to the gamma correction table generated in the gamma-correction-table generation process at Step S103 (Step S104).

As described above, even when mottle of lightness occurs in a captured image, the calibration system 10 accurately calculates the representative value for each tone of the color value for each patch in the test chart 51 and the reference chart 61 by weighting each patch (Step S135) based on the dispersion of the color value of the pixel inside the patch in the captured image and the prediction lightness of this patch in the captured image when the patch is assumed to be a blank part. Thus, the calibration system 10 ensures preventing the mottle of lightness in the captured image from affecting the result of the correction of the tone characteristics. Therefore, the calibration system 10 ensures improvement of accuracy of the correction of the tone characteristics.

When, by a photographing environment for the test chart 51 and the reference chart 61, prediction lightness of a part corresponding to a specific patch is excessively high due to occurrence of halation in response to an illumination condition or similar cause, or prediction lightness of a part corresponding to a specific patch is excessively low due to reflection of a shadow of some sort of an object such as a photographer into a captured image or similar cause, the calibration system 10 reduces the influence of the color value of these patches to calculate a representative value for each tone of the color value of the patch, and thus ensures improvement of accuracy of the representative value for each tone of the color value of the patch.

When, by a photographing environment for the test chart 51 and the reference chart 61, lightness of a part corresponding to a specific patch becomes higher than original lightness due to occurrence of halation in response to an illumination condition or similar cause, the calibration system 10 is susceptible to influence of noise that occurs in the captured image at the time of capture by the smart phone 20, in the part where the lightness has become higher than the original lightness, for an amount by which the lightness has become higher. That is, the dispersion (variation) in the patch where the lightness becomes higher than the original lightness becomes larger. Therefore, the calibration system 10 reduces the influence of the color value of the patch where the dispersion of the color value of the pixel is excessively large, namely the patch where the lightness is excessively higher than the original lightness to calculate a representative value for each tone of the color value of the patch, and thus ensures improving the accuracy of the representative value for each tone of the color value of the patch.

When, by a photographing environment for the test chart 51 and the reference chart 61, lightness of a part corresponding to a specific patch becomes lower than the original lightness due to reflection of a shadow of some sort of an object such as a photographer into a captured image or similar cause, the calibration system 10 is insusceptible to the influence of the noise that occurs in the captured image at the time of the capture by the smart phone 20, in the part where the lightness has become lower than the original lightness, for the amount by which the lightness has become lower. That is, the dispersion (variation) in the patch where the lightness becomes lower than the original lightness becomes smaller. Therefore, the calibration system 10 reduces the influence of the color value of the patch where the dispersion of the color value of the pixel is excessively small, namely the patch where the lightness is excessively lower than the original lightness to calculate a representative value for each tone of the color value of the patch, and thus ensures improving the accuracy of the representative value for each tone of the color value of the patch.

Because the calibration system 10 calculates a representative value after suppressing the mottle of lightness occurring in the captured image due to the characteristic of the smart phone 20 by the shading correction (Step S132) (Step S134), the calibration system 10 further ensures preventing the mottle of the lightness in the captured image from affecting the result of the correction of the tone characteristics. Therefore, the calibration system 10 further ensures improvement of the accuracy of the correction of the tone characteristics.

In the calibration system 10, as the MFP 30 includes the table generating unit 38*a*, it is not necessary for an imaging device to include a table generating unit. Consequently, in the calibration system 10, there is no need to use a sophisticated device such as the smart phone 20 as an imaging device. A general imaging device is usable, and thus this improves convenience.

Figure 19:
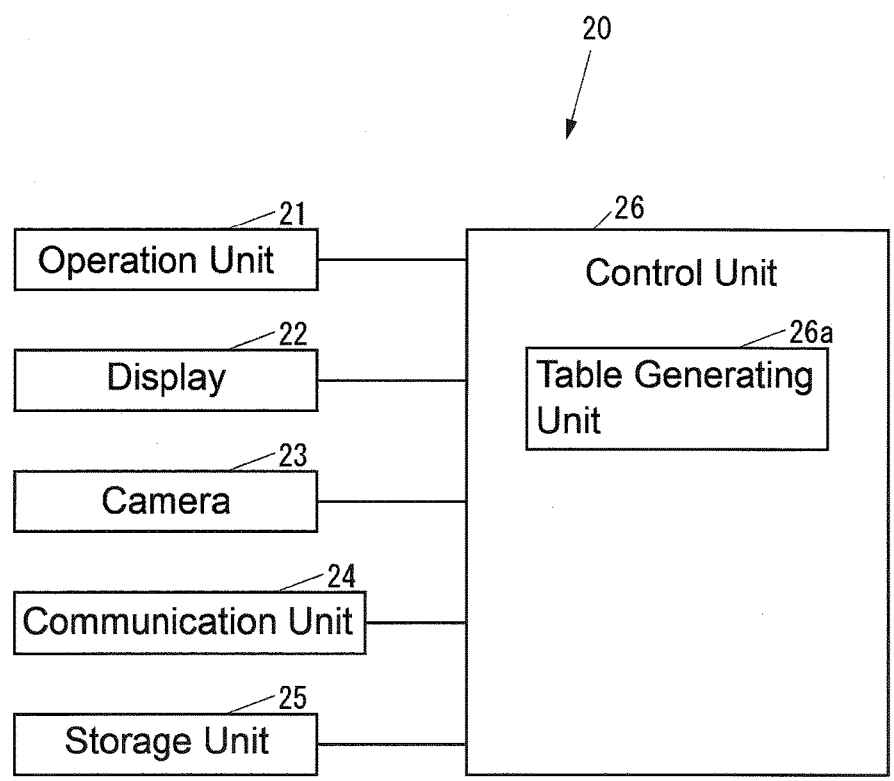
FIG. 19 illustrates an example of a smart phone, which is different from the example illustrated in FIG. 2, according to the one embodiment.

In the above description, the calibration system 10 executes the process of Step S103 in the MFP 30; however, it may execute at least a part of the process at Step S103 in the smart phone 20. For example, when the smart phone 20 executes the whole process at Step S103, the control unit 26 of the smart phone 20 functions as a table generating unit 26*a* that generates the gamma correction table for correcting the tone characteristics of the MFP 30, as illustrated in FIG. 19. Then, the control unit 26 of the smart phone 20 transmits the gamma correction table generated by the table generating unit 26*a* to the MFP 30. When the smart phone 20 executes the whole process at Step S103, there is no need to include the table generating unit in the MFP 30, and thus, this ensures reducing a process load of the MFP 30 in updating the gamma correction table 37*b*.

While the image forming apparatus of the disclosure is an MFP in the embodiment, an image forming apparatus other than an MFP may be employed. For example, the image forming apparatus of the disclosure may be an image forming apparatus such as a printer-only machine, a copy-only machine, or a FAX-only machine.

While the imaging device of the disclosure is a smart phone in the embodiment, an imaging device other than a smart phone may be employed. For example, the imaging device of the disclosure may be an imaging device such as a digital camera.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A calibration system comprising:
an imaging device; and
an image forming apparatus that generates a sheet by printing a test chart including patches of a plurality of colors, and
the image forming apparatus comprising:
a printer;
a Central Processing Unit (CPU) as a control unit; and
a storage device including a calibration program,
wherein the CPU as the control unit executes the calibration program in the storage device to function as a table generating unit that generates a gamma correction table for correcting tone characteristics of the printer to the tone characteristics in accordance with a preliminary prepared reference chart corresponding to the test chart,
wherein the table generating unit:
calculates a first weighting coefficient based on dispersion of color values of pixels inside the patch in a captured image for each of the patches, the captured image being generated by simultaneously capturing the test chart of the sheet and the reference chart with the imaging device;
calculates a second weighting coefficient based on prediction lightness of the patch in the captured image for each of the patches assuming that the patch is a blank part, and then calculates a representative value for each tone of the color value of each of the patches in the test chart and the reference chart based on an average of a weighted average of the color value of the plurality of patches based on the first weighting coefficient and a weighted average of the color value of the plurality of patches based on the second weighting coefficient; and
generates the gamma correction table based on the respective representative values in the test chart and the reference chart, and
wherein:
the table generating unit calculates the dispersion (S') of an RGB value of a pixel inside the patch in the captured image for each of the patches by Formula 1, $$S' = \frac{\sum_{n=1}^{N}(rgb_n - rgb_{ave})^2}{N-1} \quad \text{[Formula 1]}$$

in the Formula 1, $rgb_n$ denotes the RGB value of each of pixels inside a near-center region of a target patch, the suffix n of the $rgb_n$ is an integer of N kinds equal to or more than 1 and equal to or less than N, N denoting a pixel number for identifying a value of which pixel in the near-center region of the target patch the $rgb_n$ is, and $rgb_{ave}$ denotes an average value of the RGB value of each of the pixels inside the near-center region of the target patch;
the table generating unit calculates a color-value-dispersion-reference weighting coefficient (ScatterWeight) as the first weighting coefficient by Formula 2, $$ScatterWeight = \frac{1}{abs(S' - S_{ave})} \quad \text{[Formula 2]}$$

in the Formula 2, $S_{ave}$ denotes an average value of the dispersion (S') of RGB values of all the patches in the captured image, and abs( ) denotes a function that obtains an absolute value of a numerical value inside ( );
the table generating unit calculates an inverse number ($W_{n,k}$) that is a distance from any of four grid-point parts and four closest inter-grid-point parts for each of the pixels in the near-center region in the patch by Formula 3, $$W_{n,k} = \frac{1}{\sqrt{(X_k - x_n)^2 + (Y_k - y_n)^2}} \quad \text{[Formula 3]}$$

in the Formula 3, $X_k$ and $Y_k$ denote X- and Y-coordinates of any of the four grid-point parts and the four inter-grid-point parts, respectively, $x_n$ and $y_n$ denote X- and Y-coordinates of the target pixel, respectively, the suffix k of $W_{n,k}$, $X_k$, and $Y_k$ is the integer of 8 kinds equal to or more than 1 and equal to or less than 8 for identifying which values of the four grid-point parts and the four inter-grid-point parts $W_{n,k}$, $X_k$, and $Y_k$ are, and the suffix n of $W_{n,k}$, $x_n$, and $y_n$ is the integer of N kinds equal to or more than 1 and equal to or less than N, N denoting the pixel number for identifying the values of which pixel in the near-center region in the patch $W_{n,k}$, $x_n$, and $y_n$ are;
the table generating unit calculates a prediction lightness (In) of the pixel when the target pixel is assumed to be a blank part, for each of the pixels in the near-center region in the patch by Formula 4, $$I_n = \sum_{k=1}^{8}\left(\frac{W_{n,k}}{\sum_{k=1}^{8} W_{n,k}} \times L_k\right) \quad \text{[Formula 4]}$$

in the Formula 4, $L_k$ denotes the lightness of any of the four grid-point parts and the four inter-grid-point parts, the suffix k of $W_{n,k}$ and $L_k$ is the integer of 8 kinds equal to or more than 1 and equal to or less than 8 for identifying which values of the four grid-point parts and the four inter-grid-point parts $W_{n,k}$ and $L_k$ are, and the suffix n of $W_{n,k}$ and $l_n$ is the integer of N kinds equal to or more than 1 and equal to or less than N, N denoting the pixel number for identifying the values of which pixel in the near-center region in the patch $W_{n,k}$ and $l_n$ are;
the table generating unit calculates a prediction lightness (L') of the patch in the captured image for each of the patches when the patch in the captured image is assumed to be the blank part by Formula 5, $$L' = \frac{\sum_{n=1}^{N} I_n}{N} \quad \text{[Formula 5]}$$

in the Formula 5, N denotes the pixel number in the near-center region; and
the table generating unit calculates a prediction-lightness-reference weighting coefficient (LightWeight) as the second weighting coefficient for each of the patches by Formula 6, $$LightWeight = \frac{1}{\text{abs}(L' - L_{ave})} \quad \text{[Formula 6]}$$

in the Formula 6, Lave denotes the average value of the prediction lightness (L') of all the patches in the captured image, and wherein:

even when actual tone characteristics of the printer is displaced from tone characteristics of the reference chart, applying the gamma correction table to the actual tone characteristics of the printer ensures the tone characteristics of the reference chart; and the printer executes a print job onto a recording medium based on the tone characteristics of the reference chart.

2. The calibration system according to claim 1, wherein the table generating unit, after performing a shading correction on the captured image, calculates the representative value based on the captured image that has undergone the shading correction.

3. A calibration method comprising:

generating a sheet by printing a test chart including patches of a plurality of colors with an image forming apparatus that includes a printer;

generating a captured image by simultaneously capturing the test chart of the sheet generated by the generating a sheet and a preliminary prepared reference chart corresponding to the test chart with an imaging device;

calculating a dispersion (S') of an RGB value of a pixel inside a patch in the captured image for each of patches by Formula 1, $$S' = \frac{\sum_{n=1}^{N}(rgb_n - rgb_{ave})^2}{N-1} \quad \text{[Formula 1]}$$

wherein, in the Formula 1, $rgb_n$ denotes the RGB value of each of pixels inside a near-center region of a target patch, the suffix n of the $rgb_n$ is an integer of N kinds equal to or more than 1 and equal to or less than N, N denoting a pixel number for identifying a value of which pixel in the near-center region of the target patch the $rgb_n$ is and $rgb_{ave}$ denotes an average value of the RGB value of each of the pixels inside the near-center region of the target patch;

calculating a color-value-dispersion-reference weighting coefficient (ScatterWeight) as a first weighting coefficient by Formula 2, $$ScatterWeight = \frac{1}{\text{abs}(S' - S_{ave})} \quad \text{[Formula 2]}$$

wherein, in the Formula 2, $S_{ave}$ denotes an average value of the dispersion (S') of RGB values of all the patches in the captured image, and abs( ) denotes a function that obtains an absolute value of a numerical value inside ( );

calculating an inverse number ($W_{n,k}$) that is a distance from any of four grid-point parts and four closest inter-grid-point parts for each of the pixels in the near-center region in the patch by Formula 3, $$W_{n,k} = \frac{1}{\sqrt{(X_k - x_n)^2 + (Y_k - y_n)^2}} \quad \text{[Formula 3]}$$

wherein in the Formula 3, $X_k$ and $Y_k$ denote X- and Y-coordinates of any of the four grid-point parts and the four inter-grid-point parts, respectively, $x_n$ and $y_n$ denote X- and Y-coordinates of the target pixel, respectively, the suffix k of $W_{n,k}$, $X_k$, and $Y_k$ is the integer of 8 kinds equal to or more than 1 and equal to or less than 8 for identifying which values of the four grid-point parts and the four inter-grid-point parts $W_{n,k}$, $X_k$, and $Y_k$ are, the suffix n of $W_{n,k}$, $x_n$, and $y_n$ is the integer of N kinds for identifying the values of which pixel in the near-center region in the patch $W_{n,k}$, $x_n$, and $y_n$ are, and N denotes the pixel number in the near-center region;

calculating a prediction lightness ($l_n$) of the pixel when the target pixel is assumed to be a blank part, for each of the pixels in the near-center region in the patch by Formula 4, $$l_n = \sum_{k=1}^{8}\left(\frac{W_{n,k}}{\sum_{k=1}^{8} W_{n,k}} \times L_k\right) \quad \text{[Formula 4]}$$

wherein, in the Formula 4, $L_k$ denotes the lightness of any of the four grid-point parts and the four inter-grid-point parts, the suffix k of $W_{n,k}$ and $L_k$ is the integer of 8 kinds equal to or more than 1 and equal to or less than 8 for identifying which values of the four grid-point parts and the four inter-grid-point parts $W_{n,k}$ and $L_k$ are, the suffix n of $W_{n,k}$ and $l_n$ is the integer of N kinds equal to or more than 1 and equal to or less than N, N denoting a pixel number for identifying the values of which pixel in the near-center region in the patch $W_{n,k}$ and $l_n$ are;

calculating a prediction lightness (L') of the patch in the captured image for each of the patches when the patch in the captured image is assumed to be the blank part by Formula 5, $$L' = \frac{\sum_{n=1}^{N} l_n}{N} \quad \text{[Formula 5]}$$

wherein, in the Formula 5, N denotes the pixel number in the near-center region;

calculating a prediction-lightness-reference weighting coefficient (LightWeight) as a second weighting coefficient for each of the patches by Formula 6, $$LightWeight = \frac{1}{\text{abs}(L' - L_{ave})} \quad \text{[Formula 6]}$$

wherein, in the Formula 6, Lave denotes the average value of the prediction lightness (L') of all the patches in the captured image;

calculating a representative value for each tone of the RGB value of each of the patches in the test chart and the reference chart based on an average of a weighted average of the color value of the plurality of patches based on the first weighting coefficient and a weighted average of the color value of the plurality of patches based on the second weighting coefficient; and generating a gamma correction table based on the respective representative values in the test chart and the reference chart;

ensuring tone characteristics of the reference chart by applying the gamma correction table to actual tone characteristics of the printer, even when the actual tone characteristics of the printer is displaced from the tone characteristics of the reference chart; and executing by the printer a print job onto a recording medium based on the tone characteristics of the reference chart.

4. An image forming apparatus comprising:

a print device as an image forming unit that generates a sheet by printing a test chart including patches of a plurality of colors;

a Central Processing Unit (CPU) as a control unit; and a storage device including a calibration program, wherein the CPU as the control unit executes the calibration program in the storage device to function as a table generating unit that generates a gamma correction table for correcting tone characteristics of the image forming apparatus to the tone characteristics in accordance with a preliminary prepared reference chart corresponding to the test chart, wherein the table generating unit:

calculates a first weighting coefficient based on dispersion of color values of pixels inside the patch in a captured image for each of the patches, the captured image being generated by simultaneously capturing the test chart of the sheet and the reference chart with an imaging device;

calculates a second weighting coefficient based on prediction lightness of the patch in the captured image for each of the patches assuming that the patch is a blank part, and then calculates a representative value for each tone of the color value of each of the patches in the test chart and the reference chart based on an average of a weighted average of the color value of the plurality of patches based on the first weighting coefficient and a weighted average of the color value of the plurality of patches based on the second weighting coefficient; and generates the gamma correction table based on the respective representative values in the test chart and the reference chart, and wherein;

the table generating unit calculates the dispersion (S') of an RGB value of a pixel inside the patch in the captured image for each of the patches by Formula 1, $$S' = \frac{\sum_{n=1}^{N}(rgb_n - rgb_{ave})^2}{N-1} \quad \text{[Formula 1]}$$

in the Formula 1, $rgb_n$ denotes the RGB value of each of pixels inside a near-center region of a target patch, the suffix n of the $rgb_n$ is an integer of N kinds equal to or more than 1 and equal to or less than N, N denoting a pixel number for identifying a value of which pixel in the near-center region of the target patch the $rgb_n$ is, and $rgb_{ave}$ denotes an average value of the RGB value of each of the pixels inside the near-center region of the target patch;

the table generating unit calculates a color-value-dispersion-reference weighting coefficient (ScatterWeight) as the first weighting coefficient by Formula 2, $$ScatterWeight = \frac{1}{\text{abs}(S' - S_{ave})} \quad \text{[Formula 2]}$$

in the Formula 2, $S_{ave}$ denotes an average value of the dispersion (S') of RGB values of all the patches in the captured image, and abs( ) denotes a function that obtains an absolute value of a numerical value inside ( );

the table generating unit calculates an inverse number ($W_{n,k}$) that is a distance from any of four grid-point parts and four closest inter-grid-point parts for each of the pixels in the near-center region in the patch by Formula 3, $$W_{n,k} = \frac{1}{\sqrt{(X_k - x_n)^2 + (Y_k - y_n)^2}} \quad \text{[Formula 3]}$$

in the Formula 3, $X_k$ and $Y_k$ denote X- and Y-coordinates of any of the four grid-point parts and the four inter-grid-point parts, respectively, $x_n$ and $y_n$ denote X- and Y-coordinates of the target pixel, respectively, the suffix k of $W_{n,k}$, $X_k$, and $Y_k$ is the integer of 8 kinds equal to or more than 1 and equal to or less than 8 for identifying which values of the four grid-point parts and the four inter-grid-point parts $W_{n,k}$, $X_k$, and $Y_k$ are, and the suffix n of $W_{n,k}$, $x_n$, and $y_n$ is the integer of N kinds equal to or more than 1 and equal to or less than N, N denoting a pixel number for identifying the values of which pixel in the near-center region in the patch $W_{n,k}$, $x_n$, and $y_n$ are;

the table generating unit calculates a prediction lightness ($l_a$) of the pixel when the target pixel is assumed to be a blank part, for each of the pixels in the near-center region in the patch by Formula 4, $$l_n = \sum_{k=1}^{8}\left(\frac{W_{n,k}}{\sum_{k=1}^{8} W_{n,k}} \times L_k\right) \quad \text{[Formula 4]}$$

in the Formula 4, $L_k$ denotes the lightness of any of the four grid-point parts and the four inter-grid-point parts, the suffix k of $W_{n,k}$ and $L_k$ is the integer of 8 kinds equal to or more than 1 and equal to or less than 8 for identifying which values of the four grid-point parts and the four inter-grid-point parts $W_{n,k}$ and $L_k$ are, and the suffix n of $W_{n,k}$ and $l_n$ is the integer of N kinds equal to or more than 1 and equal to or less than N, N denoting a pixel number for identifying the values of which pixel in the near-center region in the patch $W_{n,k}$ and $l_n$ are;

the table generating unit calculates a prediction lightness (L') of the patch in the captured image for each of the patches when the patch in the captured image is assumed to be the blank part by Formula 5, $$L' = \frac{\sum_{n=1}^{N} I_n}{N} \quad \text{[Formula 5]}$$

in the Formula 5, N denotes the pixel number in the near-center region; and the table generating unit calculates a prediction-lightness-reference weighting coefficient (LightWeight) as the second weighting coefficient for each of the patches by Formula 6, $$LightWeight = \frac{1}{\text{abs}(L' - L_{ave})} \quad \text{[Formula 6]}$$

in the Formula 6, Lave denotes the average value of the prediction lightness (L') of all the patches in the captured image, and wherein:
- even when actual tone characteristics of the print device is displaced from the tone characteristics of the reference chart, applying the gamma correction table to the actual tone characteristics of the printer ensures the tone characteristics of the reference chart; and
- the print device executes a print job onto a recording medium based on the tone characteristics of the reference chart.

\* \* \* \* \*